United States Patent
Tegeder et al.

(10) Patent No.: US 10,216,682 B2
(45) Date of Patent: Feb. 26, 2019

(54) CONFIGURATION DISTRIBUTION

(71) Applicant: epro GmbH, Gronau (DE)

(72) Inventors: Uwe Tegeder, Salzbergen (DE); Sven Wermers, Gronau (DE); Hilmar Hermens, Nordhorn (DE)

(73) Assignee: epro GmbH, Gronau (DE)

( * ) Notice: Subject to any disclaimer, the term of this patent is extended or adjusted under 35 U.S.C. 154(b) by 275 days.

(21) Appl. No.: 15/183,442

(22) Filed: Jun. 15, 2016

(65) Prior Publication Data

US 2017/0364468 A1    Dec. 21, 2017

(51) Int. Cl.
| | | |
|---|---|---|
| *G06F 13/10* | (2006.01) | |
| *G06F 15/177* | (2006.01) | |
| *G06F 13/40* | (2006.01) | |
| *G06F 13/42* | (2006.01) | |

(52) U.S. Cl.
CPC ...... *G06F 13/4081* (2013.01); *G06F 13/4282* (2013.01)

(58) Field of Classification Search
CPC .................................................. G06F 15/177
See application file for complete search history.

(56) References Cited

U.S. PATENT DOCUMENTS

| | | | |
|---|---|---|---|
| 7,360,240 B2 | 4/2008 | King | |
| 2005/0026486 A1* | 2/2005 | Thomas | G06F 9/4413 439/188 |
| 2009/0133010 A1* | 5/2009 | Bandholz | G06F 8/65 717/168 |
| 2014/0074261 A1* | 3/2014 | Wang | H05K 7/20836 700/90 |
| 2015/0058506 A1* | 2/2015 | Muhsam | G06F 13/409 710/104 |
| 2015/0058542 A1* | 2/2015 | Chao | H05K 7/1498 711/103 |
| 2015/0220350 A1* | 8/2015 | Katsumata | G06F 9/4416 713/2 |
| 2017/0127550 A1* | 5/2017 | Heinrichs | G06F 15/177 |
| 2017/0160776 A1* | 6/2017 | Ahmed | G06F 1/26 |

* cited by examiner

*Primary Examiner* — Ilwoo Park
(74) *Attorney, Agent, or Firm* — Luedeka Neely Group, P.C.; Rick Barnes

(57) ABSTRACT

A method of provisioning cards in a rack mount system, by selecting a desired configuration file from a library of configuration files, and copying the configuration file into a memory device. The memory device is inserted into the rack mount system and powered up. Whereupon the configuration file automatically and without any further user intervention provisions a card of the rack mount system.

8 Claims, 2 Drawing Sheets

CONFIGURATION DISTRIBUTION

FIELD

The present invention relates to electronics used to monitor and control industrial assets and particularly relates to electronics used to commission and configure other electronics that are associated with industrial assets and typically monitor, protect, and control assets and predict the health of assets

INTRODUCTION

Rack mount systems provide a frame—also known as the rack—that receives different rack-mount components, commonly called cards. Typically, the rack is designed to accommodate several cards, such as four, eight, nine, sixteen, etc. The rack typically provides elements of the system that can be commonly used for all of the cards in the system, which elements might be unnecessarily redundant if these elements were individually provided by each of the cards.

For example, power supply, cooling, and network or bus communications are typically provided by the rack. These services might be provided in a redundant manner, but are provided in a manner that reliability and uptime are enhanced without unnecessarily providing duplicated services. The card portion of the design is removable from the rack and can be replaced or augmented, typically without powering down or otherwise taking the other cards off-line.

Cards can be a number of different devices, such as memory cards, storage cards, processor cards, instrument cards, sensor cards, interface cards, and so forth. The rack can be a chassis, which is often a relatively passive device that provides services to the cards, or it can also be a more active device such as a motherboard. The term rack is used herein as shorthand to include all such backplane devices, whether active or passive.

Both the term "rack" and "card" as used herein are not to be limited to specific embodiments, but are to include systems where an electronic component (card) is placed into a larger system (rack), in the manner as described throughout this specification. Further, although there are various standardized systems and sizes for rack mount systems, the terms as used herein are not limited to any specific standard or size.

Rack mount systems are often sold or other provided with the cards prepopulated in the rack. For some applications, all or many of the cards in the rack are identical, and need to be set up with substantially identical configurations. In other applications, multiple rack mount systems are populated with similar cards, and the entire systems themselves need to be set up with substantially identical configurations. These configurations are typically created by copying a configuration file into a specific memory location of the rack or the card. When the component is activated, the functions and operation of the component are provisioned according to the information in the configuration file or files.

Provisioning means that operational instructions are programmed into the card. For example, a given card might be able to perform various functions in a variety of different ways, and provisioning instructs the card more particularly how to perform its functions, or the format in which it will receive data, or the format in which it will send data, or its logical address, or any one of a variety of other instructions.

Provisioning multiple substantially identical racks, cards, or entire rack mount systems with the appropriate configuration files can be a prodigious task, even if the components and the configuration files are identical, because of the work involved in copying the configuration file to each component.

This task is often performed in the following manner:
1. The configuration software is initiated.
2. The rack with the cards loaded is connected to the computing device, either directly or via a networked connection.
3. A configuration file or set of configuration files are selected, such as from a library of configuration files.
4. The selected configuration file to copied to each card in the rack.
5. Steps 2-4 are repeated as desired for additional racks.

What is needed, therefore, is a system that reduces the effort and time required to provision similar racks of cards with similar configuration files, at least in part.

SUMMARY

The above and other needs are met by a method of provisioning cards in a rack mount system, by selecting a desired configuration file from a library of configuration files, and copying the configuration file into a memory device. The memory device is inserted into the rack mount system and powered up. Whereupon the configuration file automatically and without any further user intervention provisions a card of the rack mount system.

In various embodiments, the memory device is inserted in a rack of the rack mount system. In some embodiments, the memory device is inserted into a card of the rack mount system. In some embodiments, the memory device is inserted into both at least one card of and a rack of the rack mount system. In some embodiments, multiple configuration files are copied into the memory device, and the configuration files are copied into memories of cards in the rack mount system according to a type of card. In some embodiments, the memory device is inserted into the rack mount system after installation of the rack mount system at a user facility. In some embodiments, the rack mount system had been previously provisioned, then powered down, and the memory device contained a new configuration file for the rack mount system.

According to another aspect of the invention there is described a method of provisioning cards in a rack mount system, by selecting a desired configuration file from a library of configuration files, and copying the configuration file into a memory device. The memory device is inserted into the rack mount system. The rack mount system is powered-up, whereupon the configuration file in the memory device is automatically and without any further user intervention copied into memories of cards in the rack mount system.

In various embodiments according to this aspect of the invention, the memory device is inserted in a rack of the rack mount system. In some embodiments, the memory device is inserted into a card of the rack mount system. In some embodiments, the memory device is inserted into both at least one card of and a rack of the rack mount system. In some embodiments, multiple configuration files are copied into the memory device, and the configuration files are copied into memories of cards in the rack mount system according to a type of card. In some embodiments, the memory device is inserted into the rack mount system after installation of the rack mount system at a user facility. In some embodiments, the rack mount system had been previously provisioned, then powered down, and the memory device contained a new configuration file for the rack mount system.

According to yet another aspect of the invention there is described a rack mount system having a rack for receiving cards. A card is disposed within the rack, with a memory device disposed on at least one of the rack and the card. A configuration file is disposed on the memory device, wherein upon power-up of the rack mount system, the configuration file automatically and without any user intervention provisions the card that is disposed with the rack.

In various embodiments according to this aspect of the invention, a plurality of cards are disposed within the rack, and the configuration file automatically and without any user intervention provisions all of the cards that are disposed with the rack. In some embodiments, the memory device is disposed on the rack and not the card. In some embodiments, the memory device is disposed on the card and not the rack. In some embodiments, a plurality of cards are disposed within the rack, a plurality of configuration files are disposed on the memory device, and the configuration file automatically and without any user intervention provisions all of the cards that are disposed within the rack, using one of the configuration files for each of the plurality of cards according to card type. In some embodiments, a plurality of memory devices are disposed on the rack.

DRAWINGS

Further advantages of the invention are apparent by reference to the detailed description when considered in conjunction with the figures, which are not to scale so as to more clearly show the details, wherein like reference numbers indicate like elements throughout the several views, and wherein.

DESCRIPTION

With reference now to the figures, there is described a rack mount system 200 according to an embodiment of the present invention. The rack mount system 200 includes a rack 204 that holds cards 202. It is appreciated that the depiction of the rack 204 and the cards 202 is representational only, and not limiting. For example, in various embodiments, the rack 204 may hold more cards 202 or fewer cards 202 than depicted, and may hold them in a different orientation that the vertical orientation as depicted. In various embodiments, the cards 202 may be either relatively larger or relatively smaller in comparison to the rack 204. In some embodiments, the rack 204 is a larger structure than that as depicted, with doors that close and contain the cards 202 within a protective environment.

Figure 2:
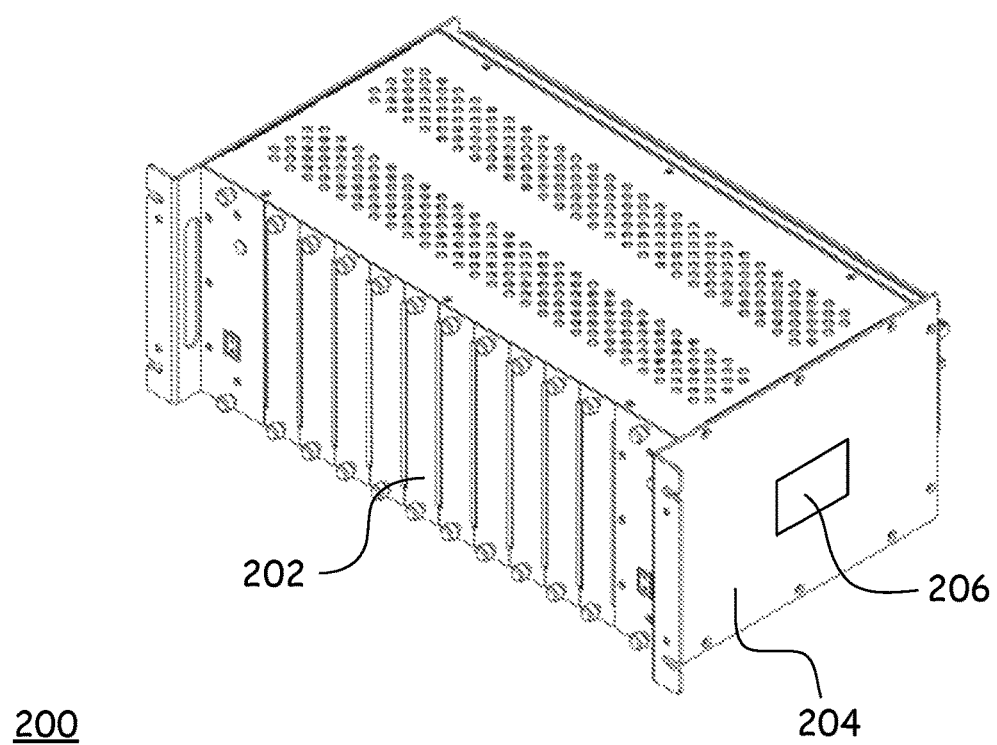
FIG. 2 is a rack mount system according to an embodiment of the present invention.
Figure 3:
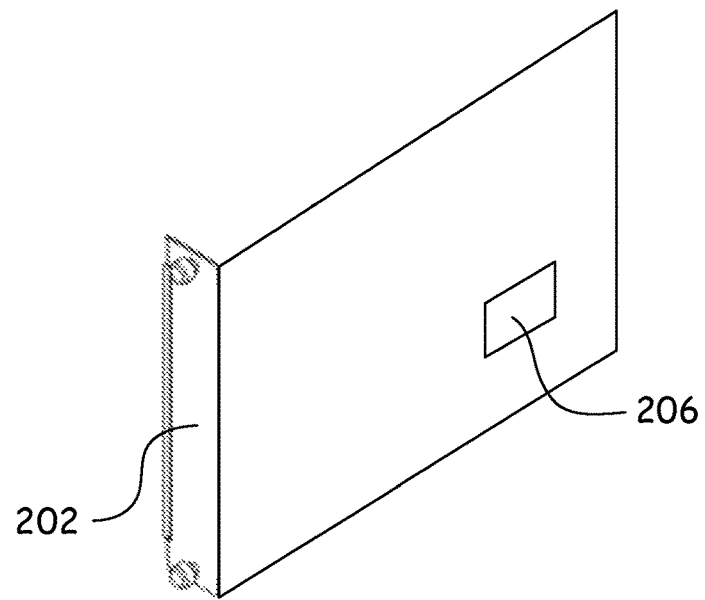
FIG. 3 is a card according to an embodiment of the present invention.

Disposed on at least one of the rack 204 and the card 202 is a memory device 206. FIGS. 2 and 3 depict representative embodiments for the location of the memory device 206. In other embodiments, for example, the memory device 206 is disposed within the rack 204, so that it is protected from the ambient environment. In some embodiments the rack 204 includes the memory device 206 as described below, but the individual cards 202 do not. In some embodiments, the rack 204 does not have the memory device 206, but the cards 202 do. In some embodiments, all of the cards 202 include the memory device 206, and in other embodiments only one of the cards 202 within a given rack 206 includes the memory device 206.

In various embodiments, the memory device 206 is pre-programmed, prior to attachment to the rack 204 or the card 202, with the desired configuration file. In various embodiments, the memory device 206 is pin mounted, surface mounted, socket mounted, or carrier mounted to the rack 204 or the card 202.

Figure 1:
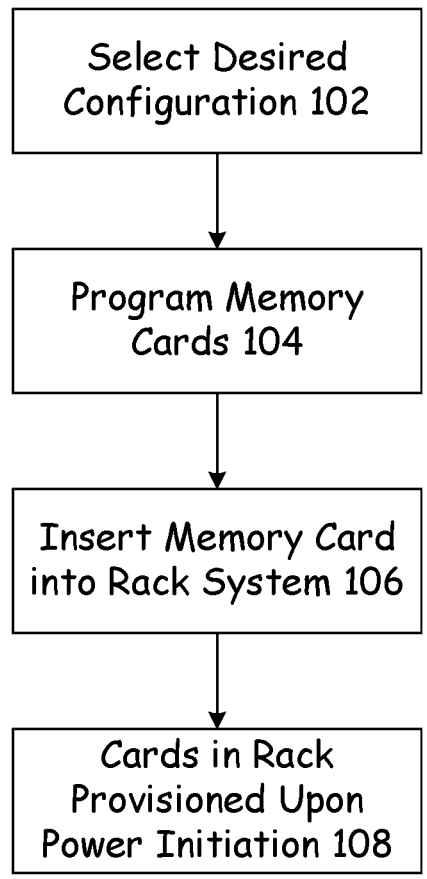
FIG. 1 is a flow chart of a method for provisioning a rack mount system according to an embodiment of the present invention.

With reference now to FIG. 1, there is described a method 100 of provisioning the cards 202 according to an embodiment of the present invention. The provisioning is accomplished in different steps that are performed, in some embodiments, at different times. The first step is to select the desired configuration file, as given in block 102. The second step is to program the memory devices 206 with the selected configuration file, as given in block 104. The third step is to insert at least one memory device 206 into at least one card 202 or one rack 204 of each rack mount system 200 to be provisioned. The fourth step is to power on the rack mount system 200, to complete the provisioning process. These steps are described in more detail below.

As given in block 102, the desired configuration file is selected. In some embodiments this is performed on a personal computer or other computing device as described herein, such as by selecting the desired configuration file from a library of such files. The selected configuration file is then programmed into one or more of the memory devices 206, as given in block 104. In some embodiments this step is performed prior to the memory devices 206 being inserted into either of the cards 202 or the rack 204. In some embodiments, the memory devices 206 are programmed in a structure that can hold many of the memory devices 206 at a given time, and the selected configuration file is copied into the memory devices 206 in the structure either simultaneously or serially with little or no user intervention.

The programmed memory devices 206 are then inserted into the rack mount system 200, as given in block 106. As previously described, in various embodiments only one memory device 206 is inserted into any one rack mount system 200, and it is inserted into either one of the cards 202 or the rack 204. Alternately, one memory device 206 is inserted into each card 202. In other embodiments, one memory device 206 is also inserted into the rack 204. In various embodiments, placing a memory device 206 into either a card 202 or rack 204 is performed as a part of the initial construction of the card 202 or rack 204. In other embodiments, the memory device 206 is not placed into either the card 202 or the rack 204 until it is about to be shipped to a customer.

At some point, the rack mount system 200 will be powered on, and the provisioning process will be completed. During this initial power-up process, the configuration file that is programmed into the memory device 206 is activated, and configures one or more cards 202 according to the specifics of the configuration file in the memory device 206. This is accomplished in various ways, according to differing embodiments.

In one embodiment, there is a programmed memory device 206 in every card 202. Upon power-up, the configuration file in the memory device 206 is activated, and provisions the card 206 in which it is resident according to the instructions contained in the configuration file.

In another embodiment, there is a programmed memory device 206 in only one host card 202 in a given rack mount system 200. Upon power-up, the configuration file in the memory device 206 of the host card 202 is activated, and not only provisions the host card 206 in which it is resident, but communicates with the other cards 202 in the rack mount system 200 and, if they do not have their own programmed memory device 206 resident, copies the configuration file from the host card 206 to a memory of the other cards 202, which are then provisioned according to the configuration file that has been copied to them. This can be done with either one host card 202 per rack mount system 200, or more than one but less than all host cards 202 per rack mount system 200. In some embodiments, the only difference between a host card 202 and other cards 202 is that a host card includes the memory device 206 with a configuration file.

In some embodiments, the programmed memory device 206 is placed only into the rack 204 of the rack mount system 200. Upon power-up, the configuration file in the rack 204 is activated, and is copied to a memory on each card 202 disposed within the rack 204. In some embodiments, the configuration file within the memory device 206 that is disposed on the rack 204 is only copied to those cards 202 that do not have a resident memory device 206. In some embodiments, the configuration file in the memory device 206 that is disposed on the rack 204 is only copied to those cards 202 of a specific type.

In some embodiments, there are several memory devices 206 disposed on the rack 204, each with a different configuration file, or one memory device 206 with a plurality of different configuration files, and one of the available configuration files is copied as appropriate to cards 202 that are associated in some way with one of the selection of available configuration files, such as by the type or intended function of the various cards 202.

For example, all cards 202 that are of a type that connect to vibration sensors are provisioned according to one type of configuration file, and all cards 202 that are of a type that connect to temperature sensors are provisioned according to another type of configuration file. Other card 202 types could include sound sensor cards 202, infrared sensor cards 202, current or voltage measurement cards 202, and so forth. Other types of cards 202 are also contemplated herein. In some embodiments, each type of card 202 receives a configuration file that is specific for that type of card 202. In other embodiments, all cards 202 receive the same configuration file, regardless of the type of card 202 that it is.

In some embodiments, the configuration file disposed within a memory device 206 provisions not only those cards 202 within the rack 204 in which it is disposed (either directly disposed in the rack 204 or on a card 202 within the rack 204), but is able to be copied automatically upon power-up to memory locations on cards 202 that are disposed in other racks 204 that are in data communication with the rack 204 in which the configuration file is initially disposed.

In some embodiments the provisioning of the components occurs at a point other than power-up, and the configuration file or files are delivered by a means other than an originating memory device. For example, in some embodiment the provisioning is accomplished using configuration software installed on a computing device, such as a personal computer, laptop, tablet, handheld device, mainframe, etc. Further, the provisioning can be accomplished over physical connections, such as network lines, or over radio communications, such as 802.11 or Bluetooth communications.

The power-up process that initiates the final provisioning of the cards 202 can, in various embodiments, be inaugurated at the factory where the rack mount system 200 is assembled, at a distributor location, such as prior to shipment to a specific customer, or at a customer site, either before or after final installation. In some embodiments, various portions of the provisioning process as described above are performed at more than one of these or other locations.

In some embodiments, the memory devices 206 are sent separately from the rack mount systems 200, and are installed as described above "just in time," so to speak, so that the cards 202 do not need to be inventoried according to a specific configuration. In some embodiments an existing rack mount system 200 can be powered down, one or more existing memory devices 206 removed, and one or more new memory devices 206 inserted into the rack mount system 200 as described above, and then upon power-up the rack mount system 200 is re-provisioned according to the configuration file provided on the new memory device or devices 206.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method of provisioning cards in a rack mount system, the method comprising the steps of:
   placing a desired selection of unprovisioned cards in a rack,
   selecting desired configuration files for the cards in the rack from a library of configuration files,
   copying the configuration files into a memory device,
   inserting the memory device on the rack, and
   powering up the rack mount system,
   wherein the configuration files in the memory device automatically and without any further user intervention provision the cards in the rack mount system upon power-up of the rack mount system.

2. The method of claim 1, wherein the step of copying the configuration files into the memory device is performed after the step of inserting the memory device into the rack mount system, and is accomplished wirelessly.

3. The method of claim 2, wherein the step of copying the configuration files into the memory device is performed automatically by the rack mount system communicating with a previously provisioned rack mount system.

4. The method of claim 2, wherein the step of copying the configuration files into the memory device is performed by communicating with the rack mount system with a handheld device.

5. The method of claim 4, wherein the handheld device communicates with the rack mount system via Bluetooth.

6. The method of claim 1, wherein the configuration files provision the cards in the rack mount system according to a type of card.

7. The method of claim 1, wherein the memory device is inserted into the rack after installation of the rack mount system at a user facility.

8. The method of claim 1, wherein the memory device is inserted into the rack at a fabrication facility and the rack mount system is powered-up after installation of the rack mount system at a user facility.

* * * * *